United States Patent

Buglewicz

[15] 3,705,265

[45] Dec. 5, 1972

[54] TELEPHONE ANSWERING DEVICE

[72] Inventor: Neal J. Buglewicz, 12 Empty Saddle Road, Rolling Hills Estates, Calif. 90274

[22] Filed: May 7, 1971

[21] Appl. No.: 141,245

[52] U.S. Cl. .................................................179/6 R
[51] Int. Cl. ..............................................H04m 1/64
[58] Field of Search.............179/6 R, 6 AC, 6 C, 6 E, 100.1 C, 179/100.2 S, 100.3 D, 100.4 D

[56] References Cited

UNITED STATES PATENTS 3,466,396 9/1969 Guimond ..........................179/6 AC
3,376,390 4/1968 Hashimoto.........................179/6 AC
2,935,566 5/1960 Karl .................................179/6 AC

*Primary Examiner*—Howard W. Britton
*Assistant Examiner*—Raymond F. Cardillo, Jr.
*Attorney*—William R. Lane

[57] ABSTRACT

Telephone answering and recording device in which the answering function is triggered by an incoming call and the recording function is conditioned by the charging of time limiting capacitors during the answering function. The capacitors have transistors connected therewith which are triggered by the residual voltage on the capacitors upon completion of the answering function to signal the commencement of the recording function and control the duration of the recording function.

2 Claims, 2 Drawing Figures

Figures 1, 2:
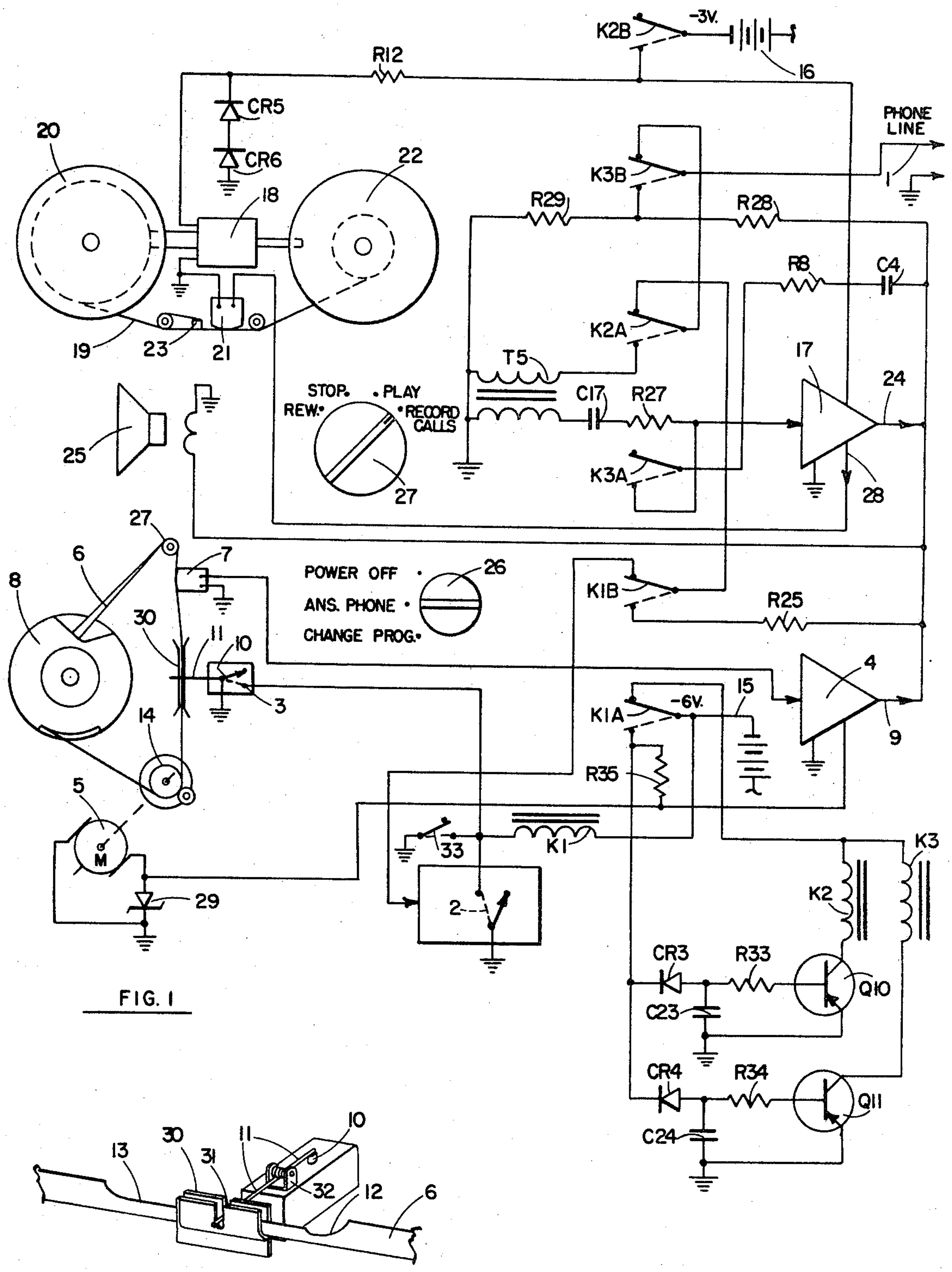

INVENTOR.
NEAL J. BUGLEWICZ
BY William R. Lane
ATTORNEY

TELEPHONE ANSWERING DEVICE

BACKGROUND OF THE INVENTION

1. Field of the Invention

The invention relates to devices which automatically answer a telephone in response to a ring indicating an incoming call, broadcast a prepared message from a tape recording and request the caller to leave a message during the following recording period.

2. Prior Art

Devices of this type are generally known as typified by United States patent to O'Dwyer U.S. Pat. No. 2,815,401 in which stepping switches are used to control the timing of the various functions, and a time delay circuit is utilized to over-ride the operation of the device. U.S. patent to Waldman U.S. Pat. No. 3,127,474 also illustrates a device of this general character in which a common drive means is utilized to selectively drive the broadcast and the recording tapes.

STATEMENT OF THE INVENTION

The invention comprises a telephone answering and recording device in which an incoming telephone call triggers a relay and a locking switch to actuate the delivery of an outgoing prerecorded message. Time limiting capacitors are charged during the delivery of the outgoing message and triggered upon the completion of such message by residual voltage from the capacitors being applied to transistors connected with the capacitors to actuate recording apparatus, signal when a message may be commenced and control the time period of the message.

In the accompanying drawing, which forms a part of this specification, there is shown a presently preferred embodiment of the invention, in which FIG. 1 is a simplified schematic wiring diagram illustrating an embodiment of the invention, and FIG. 2 is a view of a switch and cut-off arrangement.

Referring now to the drawing, there is shown a connection 1 adapted to be appropriately connected into a telephone line. From the connection at 1, the circuit connects through contacts K3b, K2A and K1B to a ring trigger switch 2 which is electronically closed in response to the ring voltage on the phone line and is adapted to be held in a closed position as shown by dotted line in the drawing for approximately three seconds. This causes motor 5 to run, tape 6 to move, and in approximately one second, switch 3 to close by action of lever 11. Switch 3 remains closed during the operation of the outgoing message function as hereinafter described.

The closing of the ring trigger switch energizes relay K1 and subsequent closing of locking switch 3 holds K1 energized for the duration of the outgoing message function. Relay K1 closes contact K1A to the dotted line position in the drawing to thereby apply operating potential to the outgoing message amplifier 4 (herein referred to as the A-Deck amplifier) and the motor 5 (the A-Deck motor), which, through a capstan and pinch roller arrangement 14, draws tape 6 from the cartridge 8 over guide 27 past a broadcast head 7 (the A-Deck head) to transmit a pre-recorded message from the tape to the A-Deck amplifier 4. The tape proceeds past head 7 through a track 30 having a slot 31 for receiving an arm of lever 11 which rides on the top edge of the tape. Lever 11 is pivotally mounted on bracket 32 and is provided with a central coiled portion which acts as a bearing. Meanwhile, electronic switch 2 restores to the solid line position three seconds later, but locking switch 3, which parallels switch 2, maintains K1 energized during the broadcast function.

Relay K1 also closes contact K1B to permit the outgoing message to be transmitted from output of amplifier 4 at 9 into the phone line through contacts K2A and K3B.

Closing of contact K1A also applies −6 volts to capacitors C23 and C24 through diodes CR3 and CR4 respectively. Capacitors C23 and C24 are connected through limiting resistors R33 and R34, respectively, to the bases of transistors Q10 and Q11. These transistors cannot conduct at this time because no collector voltage has as yet been applied to them.

At the conclusion of the outgoing message, the locking switch 3, which has a switch button 10 held downwardly in closed position by the other arm of lever 11, is released by having the arm portion of lever 11 which normally rides on top of tape 6, drop into notch 12 to thereby allow the switch button 10 to raise and disconnect the ground return from relay K1, thus causing contacts K1A and K1B to restore to the solid line position. This disconnects the motor and the A-Deck amplifier 4 from their power source and causes the tape to stop. Tape 6 is also provided with a cut-away portion 13 connected with the notch 12 for engaging the arm of lever 11 when it raises from the notch 12. This cut-away portion is not as deep as notch 12 but is sufficiently deep so as to allow switch button 10 to remain released while still allowing a sufficient area of the sides of the tape to be engaged by the capstan and pinch roller arrangement 14 of motor 5 to properly drive the tape. The notch 12 is of insufficient length to prevent proper driving of the tape, but is sufficiently deep to positively release button 10 and switch 3. Cut-away portion 13 is sufficiently long to permit tape 6 to coast to a stop with button 10 disengaged. This arrangement permits the use of a low tolerance, inexpensive switch while still providing reliable operation.

Upon stoppage of the outgoing message function, K1A restores to the solid line position in the drawing as described above and simultaneously applies −6 volts from source 15 to the collectors of transistors Q10 and Q11 through relays K2 and K3, respectively. The restoring of K1A also removes the charging voltage from capacitors C23 and C24 which continue to discharge through the bases of transistors Q10 and Q11, providing turn-on bias, and since the collectors of Q10 and Q11 now have voltage applied thereto, the relays K2 and K3 now operate.

A time constant of approximately thirty seconds is chosen for capacitor C23 and one-half second is chosen for capacitor C24.

Relay contact K2B closes to the dotted line position in the drawing and applies −3 volts from source 16 to the B-Deck amplifier 17 and motor 18 to move recording tape 19 from supply reel 20 past the recording and playback head 21 to take-up reel 22. An erase magnet 23 is positioned to automatically erase any old messages previously recorded.

The output of B-Deck amplifier 17 at 24 is delivered to loudspeaker 25 to enable monitoring of incoming calls, if desired. A secondary output 28 of B-Deck amplifier 17 is connected to recording head 21 for recording on tape 19. At the same time, relay contact K2A closes to the dotted line position in the drawing thereby connecting the primary of matching transformer T5 into the B-Deck input circuit for the approximately thirty seconds duration of the incoming message time period.

Also simultaneously with the operation of K2, K3 operates for one-half second as previously described. K3A closes to the dotted line position in the drawing to connect the output of B-Deck amplifier 17 back into its input through the frequency determining network R8 and C4. This causes the B-Deck amplifier 17 to oscillate at approximately 1,400 Hz for one-half second to produce a sharp tone that is transmitted to the phone line 1 through the now closed contact K3B (dotted line position in the drawing) to voltage divider R28 and R29. This brief tone signals the caller to begin leaving a message to be recorded.

Relay K3 is released in approximately one-half second upon discharge of capacitor C24, and relay contact K3A restores to the solid line position in the drawing thereby stopping the 1,400 Hz tone. Contact K3B also restores to the solid line position in the drawing thereby connecting the phone line 1 back to matching transformer T5 through contact K2A—which is still being held in the closed position shown in dotted line on the drawing. Any message from the caller on the phone line is accordingly transmitted to the input of the B-Deck amplifier 17 through capacitor C17 and resistor R27 and is amplified and recorded on tape 19 as well as being broadcast through loudspeaker 25.

Upon discharge of capacitor C23 (in approximately 30 seconds) relay K2 is released, relay contact K2B restores to the solid line position in the drawing, thus releasing the phone line 1 and connecting it back to the ring trigger circuit in readiness for another telephone call.

A manual control switch 33 is provided in parallel with the ring trigger switch 2 and operatively connected with relay X1 to operate the apparatus at will, for instance, when it is desired to change the program on the broadcast tape 6. Switch 33 may also be used to place a signal on the recording tape to locate the end of a series of incoming calls or the beginning of a series of incoming calls. By applying voltage through switch 33 for a very short time, which is less than the time delay in locking switch 3, tape 6 is moved a very short distance and not sufficiently to have the tape engaging arm of 11 ride out of the cut-away portion 13 and be returned to actuate locking switch 3. Ordinarily, the tape engaging arm of lever 11 raises out of the cut-away portion of tape 6 in about 1 second after motor 5 starts thereby providing a delayed action to starting switch 3. Since the tape has not moved sufficiently to cause lever to close locking switch 3, relay K1 is released immediately upon release of switch 33 thereby restoring K1A to operate K3 as previously described to oscillate amplifier 17 and produce a brief tone signal on tape 19. By this arrangement, a person returning to or leaving his telephone location can place one or more short tone signals on the incoming tape to separate incoming calls. By holding switch 33 closed for a period of time longer than the time delay in switch 3, the apparatus will operate for the entire cycle.

The A-Deck arrangement is provided with a control knob 26 which is connected to a three-position switch (not shown) which in turn is appropriately connected to the operating parts of the A-Deck arrangement to selectively obtain one of the conditions of: Power Off; Answer Phone; or Change Program (which is obtained by converting the A-Deck circuit into a recorder to enable the user to program this outgoing message function). The B-Deck arrangement is provided with a similar control knob 27 and switch (also not shown) to obtain selectively, one of the conditions of: Stop; Record Calls; Playback: or Rewind. Since these switches and their hook-up in arrangements of this type are well known in the art, they will not be described here in detail.

In the FIG. 1. diagram, resistor R25 provides the proper resistance across the phone line to seize it. R35 is a Zener limiting resistor or Zener load resistor; CR5 and CR6 comprise voltage regulators for the purpose of speed control of the B-Deck motor 18. R12 is a current limiting resistor for CR5 and CR6; and 29 is a Zener diode voltage regulator for the A-Deck circuit.

Applicant has provided in this invention, a reliable telephone answering and recording device that is inexpensive to construct and maintain and still performs the functions of more complicated and expensive devices.

What is claimed is:

1. In a telephone answering and recording device, an outgoing message means including a tape having a prerecorded message thereon and means for transmitting the message into the telephone line including tape-capstan driving means;

a relay and a locking switch which are actuated by an incoming telephone call;

said locking switch including a switch button, a lever—one arm of which contacts said button and the other arm of which rides on the edge of said tape;

a pair of time limiting capacitors;

a contact which is closed by said relay to cause actuation of said message transmitting means and apply a voltage charge to said capacitors;

means operative upon the completion of the outgoing message for opening said locking switch to stop said message transmitting means, release said relay, open said contact and allow said capacitors to dissipate their charge;

said means operative upon completion of the outgoing message including a notch in said tape for receiving one arm of said lever to permit said switch button to raise to release position;

said notch being deeper than normally necessary to allow said switch button to move to release position but not sufficiently long to interfere with said tape-capstan driving means;

said cut-away portion being only of sufficient depth and length to maintain said button in released position while said tape is coasting to a stop position;

an incoming message means including a tape and means for operating the same to record an incoming message thereon;

said opening means being actuated by discharge of one of said capacitors during its preselected time period;

said incoming message means including an amplifier;

means operated by the discharge of said other capacitor for oscillating said amplifier for a preselected time period to produce a high-pitch tone output of short duration in said phone line;

and means operated by said one capacitor at the end of its preselected time period for releasing said phone line and restoring said outgoing message means and said incoming message means into position for receiving another telephone call.

2. A device as recited in claim 1 and further including a manual switch in parallel with the ring trigger switch and wherein said cut-away portion of said tape is of sufficient length to cause a time delay of approximately one second in the actuation of said locking switch, whereby closing said manual switch for a period time longer than the delayed action period of the locking switch actuates the outgoing message means for a complete cycle; and closing said manual switch for a period of time shorter than the delayed action period of the locking switch actuates said means operated by the discharge of said other capacitor to oscillate said amplifier and produce a signal on said incoming message tape.

* * * * *